United States Patent [19]

Muto et al.

[11] 4,293,811

[45] Oct. 6, 1981

[54] VOLTAGE REGULATOR SYSTEM FOR VEHICLE GENERATOR

[75] Inventors: Katsuya Muto, Kariya; Kazumasa Mori, Aichi; Akira Mase, Handa; Takayasu Nimura, Nagoya; Katsumi Itoh, Obu; Yoshio Akita, Ichinomiya, all of Japan

[73] Assignee: Nippondenso Co., Ltd., Kariya, Japan

[21] Appl. No.: 21,805

[22] Filed: Mar. 19, 1979

[30] Foreign Application Priority Data

Apr. 20, 1978 [JP] Japan .................................. 53-47545

[51] Int. Cl.³ .............................................. H02J 7/16
[52] U.S. Cl. ........................................ 322/60; 320/64; 322/28; 322/73
[58] Field of Search ............... 322/28, 60, 73; 320/64, 320/68

[56] References Cited

U.S. PATENT DOCUMENTS

| | | | |
|---|---|---|---|
| 3,496,443 | 2/1970 | Snedeker et al. | 320/39 |
| 3,585,490 | 6/1971 | Zelina | 322/73 X |
| 3,611,112 | 10/1971 | Lehnoff | 322/73 X |
| 3,820,009 | 6/1974 | Itoh et al. | 322/73 X |
| 3,868,558 | 2/1975 | Winkley et al. | 322/28 X |

*Primary Examiner*—Robert J. Hickey
*Attorney, Agent, or Firm*—Cushman, Darby & Cushman

[57] ABSTRACT

A semi-conductor voltage regulation system for a vehicle alternator has a timed signal generating circuit initiated by the engine starter signal. The field exciting current of the alternator is first supplied for a predetermined period after the engine has been started until the alternator is excited to start generation. When the alternator is fully excited, the regulation system operates in the well known manner.

6 Claims, 2 Drawing Figures

VOLTAGE REGULATOR SYSTEM FOR VEHICLE GENERATOR

CROSS-REFERENCE TO THE RELATED APPLICATION

The present application is related to U.S. patent application, Ser. No. 9,359 with the same title filed on Feb. 5, 1979 in the same name of the present application.

BACKGROUND OF THE INVENTION

The present invention relates to a voltage regulator for an automotive vehicle generator and, more particularly to an improved control circuit for field exciting current of a battery-excited vehicle generator.

SUMMARY OF THE INVENTION

It is a main object of the present invention to provide an improved voltage regulator system for a vehicle generator which is free from battery discharge even when a key switch is left closed for a long period of time.

It is another object of the present invention to provide a circuit for cutting field exciting current when the engine is not started and the generator does not generate a voltage.

It is further object of the present invention to reduce the battery discharging current when an engine is driven by a starter motor.

Other objects and features will be readily apparent from the following description and drawings.

DESCRIPTION OF THE PREFERRED EMBODIMENT

Figure 1:
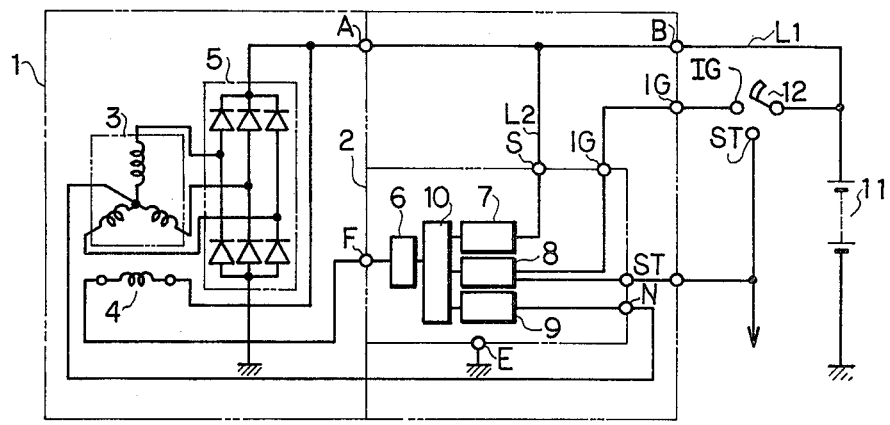
FIG. 1 is a circuit diagram showing a whole voltage regulator system according to the present invention and FIG. 2 is a main part of the above system according to the present invention.
Figure 2:
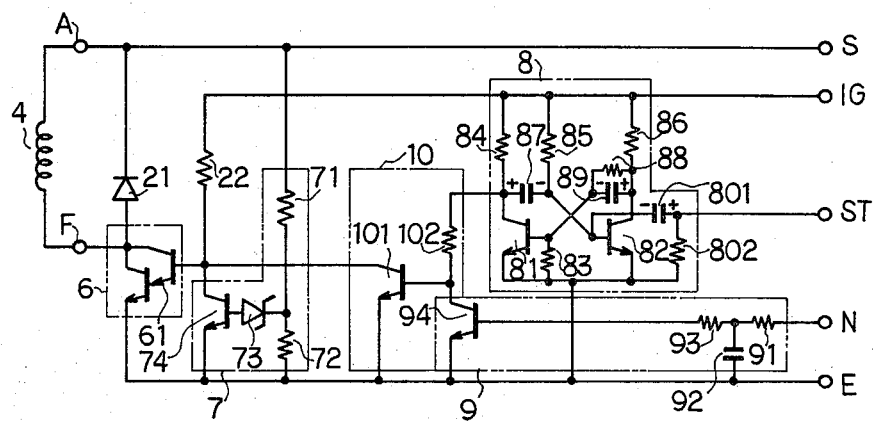

A system according to the present invention will be described with reference to FIGS. 1 and 2. The system generally comprises a generator 1 and a voltage regulator circuit 2. The generator 1 is of a well-known type and has Y-connected three phase armature windings 3, a field coil 4 and a full wave-three phase rectifier 5. The voltage regulator circuit 2 includes a well known type switching circuit such as a Darlington transistor 6 the collector-emitter path of which is connected in series with the field exciting coil, a voltage detecting circuit 7 for detecting a battery voltage to control the switching circuit constituted by Darlington transistor 6, a signal generating circuit 8 such as a monostable multivibrator as shown in FIG. 2 which generates a low level voltage signal of a predetermined period or a timed signal when a starter switch, in this case a key switch 12 having an ignition terminal IG and a starter terminal ST is switched back to the IG position after it was switched into ST position, rise-up voltage detecting circuit 9 for detecting the rise-up of the engine or generator to interrupt the timed signal transmitted from the signal generating circuit 8 and a switch driving circuit 10 for driving the switching circuit 6 into conduction in response to the timed signal. The period of the timed signal is determined so that the engine may start operation to drive the generator while the timed signal is generated, one to five seconds for instance. A battery 11 is connected to an output terminal A of the generator 1 through a terminal B on a line $L_1$. Key switch 12 is adapted to energize the signal generating circuit 8 when it is thrown into IG position or ST position.

As shown in FIG. 2, the collector of the Darlington transistor 6 is further connected to a flywheel diode 21 which is in parallel with the field exciting coil 4 and the base of Darlington transistor 6 is connected to the voltage detecting circuit 7 and a terminal IG of key switch 12 through a resistor 22. The voltage detecting circuit 7 consists of voltage dividing resistors 71 and 72, a zener diode 73 and a transistor 74. One end of the resistor 71 is connected to a terminal S which is in turn connected through line $L_2$ to the terminal B. Other connections are well known in the art. The base of the Darlington transistor 6 is also connected to the collector of a transistor 101 of the switch driving circuit 10. The monostable multivibrator comprises output and input transistors 81 and 82, resistors 83, 84, 85, 86 and 88 and capacitors 87 and 89. The output transistor 81 is normally rendered nonconductive unless the input transistors 82 is made nonconductive by a trigger signal. The base of the input transistor 82 is connected to the starter terminal ST of key switch 12 ST through a trigger circuit comprising a capacitor 801 and a resistor 802. The switch driving circuit 10 comprises, besides the transistor 101, a resistor 102 connected between the output terminal of the signal generating circuit 8 and the base of the transistor 101, which is in turn connected to the collector of an output transistor 94 of the rise-up voltage detecting circuit 9. The rise-up voltage detecting circuit 9 further includes resistors 91 and 93 and a capacitor 92 for smoothing the voltage applied across its input terminal N and earth terminal E. The input terminal N is connected to the neutral point of the Y-connected armature windings 3 as shown in FIG. 1.

In operation, when the key switch 12 is thrown into its ST position and a starter (not shown) is driven to start an internal combustion engine of a vehicle, the signal generator 8 is energized through the IG terminal of key switch 12, and battery 11 and the capacitor 801 is charged with the polarity shown in FIG. 2. When key switch 12 is turned back to the IG position, the input transistor 82 is rendered to be nonconductive by the trigger circuit (801 and 802) and, consequently, the output transistor 81 is made conductive to provide a negative level voltage on the output terminal, that is, the collector thereof since the base of the input transistor 82 is negativebiased due to discharge of the capacitor 801 through the resistor 802. The period during which the output transistor 81 is conductive is determined by the resistor 85 and capacitor 87. As a result, the switch driving circuit 10 makes the Darlington transistor 6 conductive as long as the output transistor is conductive. As the engine rotation increases, the voltage generated in the armature windings 3 increases gradually and, consequently, the voltage at the neutral point increases. Such a voltage is indicative of rise up of the engine and, also, generator and is applied to the base of the transistor 94 of the rise-up voltage detecting circuit 9 through the smoothing circuit (91, 92 and 93). As long as the voltage at the neutral point is not high enough to render the transistor 94 to be conductive, the Darlington transistor is controlled by the switch driving circuit 10 in the manner described above. When the engine operates and the neutral point voltage increases, the transistor 94 is rendered to be conductive even before the timed signal disappears so that the transistor 101 of the switch driving circuit is rendered nonconductive irrespective of the timed signal. As a result, the Darlington transistor 6 is kept conductive by the base current supplied through the resistor 22 and the generator 1 is fully excited to increase the output voltage of the generator 3 thereby charging the battery 11.

When the battery voltage further increases, the transistor 74 of the voltage detecting circuit 7 controls the Darlington transistor 6 to thereby regulate the battery charging voltage in the well-known manner.

When the engine is stopped while key switch 12 is still left closed in IG position, the field exciting current is not supplied by the Darlington transistor 6 since the output transistor 81 of the monostable vibrator is nonconductive so that the transistor 101 is rendered conductive to keep the Darlington transistor nonconductive. It should be noted that the current flowing through the transistor 101 is limited such that is does not significantly cause discharge of a battery.

In place of the monostable multivibrator, any other circuit for generating a timed signal may be used for the signal generating circuit 8.

In the above embodiment, the signal generator 8 generates a timed signal after the key switch is turned back to the IG position from the ST position so as to reduce battery discharge current while starting. However, it would be also possible to have a signal generator which generates a timed signal when key switch 12 is thrown into the ST position. In that case, the time period of the timed signal should be made longer than the former embodiment.

What is claimed is:

1. A voltage regulator for battery charging generator having a field exciting coil for an internal combustion engine having a starter motor comprising:
    a switching circuit for supplying field exciting current in a controlled manner,
    a battery voltage regulating circuit for controlling the switching operation of said switching circuit in response to the battery voltage,
    first means for generating a first signal for a predetermined period of time in response to engine starting,
    second means connected to said first means for causing said switching circuit to be nonconductive normally and to be conductive when said first signal is applied thereto, and
    third means for causing said switching circuit to be conductive in response to operation of said generator independently of said first means until said battery voltage regulating circuit starts controlling.

2. A voltage regulator for a battery charging generator having a field exciting coil for an internal combustion engine having a starter motor and a key switch including a starter terminal and an ignition terminal, comprising:
    a switching circuit connected in series with said field exciting coil,
    a control circuit connected to said switching circuit for causing said switching circuit to be conductive when the battery voltage is lower than a predetermined voltage and to be nonconductive when the battery voltage is higher than said predetermined value,
    first means connected to said starter terminal of said key switch for generating a first signal for a predetermined period of time when said key switch is turned back to said ignition terminal from said starter terminal, and
    second means responsive to said first means and to said generator for causing said switching circuit to be nonconductive when said first signal is not generated or said generator does not generate a voltage.

3. A voltage regulator according to claim 1, wherein said first means comprises
    a starter switch and a monostable multivibrator with the input connected to said starter switch.

4. A voltage regulator according to claim 2, wherein said second means comprises:
    a generator voltage sensing circuit connected to said battery charging generator and
    a transistor circuit connected to said generator voltage sensing circuit and said first means.

5. A voltage regulator for a battery charging generator having a field exciting coil for an internal combustion engine having a starter motor and a key switch including a starter terminal comprising:
    a switching circuit connected in series with said field exciting coil,
    a control circuit connected to said switching circuit for causing said switching circuit to be conductive when the battery voltage is lower than a predetermined voltage and to be nonconductive when the battery voltage is higher than said predetermined value,
    first means connected to said starter terminal of said key switch for generating a first signal in response to the operation of said starter terminal of said key switch; and
    second means connected to said first means for causing said switching circuit to be nonconductive when said first signal is not generated or said generator does not generate a voltage,
    said first means comprising:
        a monostable multivibrator with its output connected to said second means, and
        a trigger signal generating circuit connected between said first means and starter terminal of said key switch for triggering said first means when said starter switch is opened.

6. A voltage regulator system for battery charging generator having a field exciting coil for an internal combustion engine having a starter motor comprising:
    a key switch having an ignition terminal and a starter terminal,
    a switching circuit connected in series with said field exciting coil,
    a voltage detecting circuit connected to said switching circuit for causing said switching circuit to be conductive when the battery voltage is lower than a predetermined value and to be nonconductive when the battery voltage is higher than said predetermined value,
    a signal generating circuit connected to said starter terminal for generating a start signal for a predetermined period of time when said key switch is turned back to said ignition terminal from said starter terminal,
    a rise-up voltage detecting circuit for detecting the generating voltage of said generator and generating a generator signal, and
    a switch driving circuit connected to said switching circuit for causing said switching circuit to be normally nonconductive and to be conductive when said start signal or said generator signal is applied.

* * * * *